US012242399B2

(12) United States Patent
Joseph et al.

(10) Patent No.: US 12,242,399 B2
(45) Date of Patent: Mar. 4, 2025

(54) PERIPHERAL COMPONENT HANDLING OF MEMORY READ REQUESTS

(71) Applicant: Arm Limited, Cambridge (GB)

(72) Inventors: Jacob Joseph, Rotherham (GB); Tessil Thomas, Cambridge (GB); Arthur Brian Laughton, Hathersage (GB); Anitha Kona, Austin, TX (US); Jamshed Jalal, Austin, TX (US)

(73) Assignee: Arm Limited, Cambridge (GB)

( * ) Notice: Subject to any disclaimer, the term of this patent is extended or adjusted under 35 U.S.C. 154(b) by 423 days.

(21) Appl. No.: 17/678,174

(22) Filed: Feb. 23, 2022

(65) Prior Publication Data

US 2023/0267081 A1 Aug. 24, 2023

(51) Int. Cl.
*G06F 13/00* (2006.01)
*G06F 12/0862* (2016.01)
*G06F 12/0891* (2016.01)
*G06F 12/1045* (2016.01)
*G06F 13/16* (2006.01)

(52) U.S. Cl.
CPC ...... *G06F 13/1668* (2013.01); *G06F 12/0862* (2013.01); *G06F 12/0891* (2013.01); *G06F 12/1054* (2013.01); *G06F 12/1063* (2013.01); *G06F 13/161* (2013.01)

(58) Field of Classification Search
CPC ...... G06F 13/00; G06F 12/00; G06F 13/1668; G06F 12/0862; G06F 12/0891; G06F 12/1054; G06F 13/161
See application file for complete search history.

(56) References Cited

U.S. PATENT DOCUMENTS

| 6,157,977 A * | 12/2000 | Sherlock | G06F 12/0835 370/402 |
| 6,968,409 B1 | 11/2005 | Solomon et al. | |
| 2009/0216950 A1* | 8/2009 | McCalpin | G06F 12/0833 711/E12.024 |
| 2022/0188178 A1* | 6/2022 | Bert | G06F 11/0772 |

OTHER PUBLICATIONS

International Search Report and Written Opinion of the International Searching Authority for PCT/GB2022/053262 mailed Mar. 21, 2023, 16 pages.

* cited by examiner

*Primary Examiner* — Tuan V Thai
(74) *Attorney, Agent, or Firm* — NIXON & VANDERHYE P.C.

(57) ABSTRACT

Peripheral components, data processing systems and methods of operating such peripheral components and data processing systems are disclosed. The systems comprise an interconnect comprising a system cache, a peripheral component coupled to the interconnect, and a memory coupled to the interconnect. The peripheral component has a memory access request queue for queuing memory access requests in a receipt order. Memory access requests are issued to the interconnect in the receipt order. A memory read request is not issued to the interconnect until a completion response for all older memory write requests has been received from the interconnect. The peripheral component is responsive to receipt of a memory read request to issue a memory read prefetch request comprising a physical address to the interconnect and the interconnect is responsive to the memory read prefetch request to cause data associated with the physical address in the memory to be cached in the system cache.

20 Claims, 13 Drawing Sheets

PERIPHERAL COMPONENT HANDLING OF MEMORY READ REQUESTS

TECHNICAL FIELD

The present disclosure relates to data processing. In particular, the present disclosure relates to data processing systems comprising an interconnect with a peripheral component coupled to the interconnect.

DESCRIPTION

A data processing system may be provided with an interconnect via which component coupled to the interconnect can access shared resources such as a memory. One such component is a peripheral which may provide an interface to the interconnect and hence to the data processing system as a whole and the shared resources which it provides. An external agent which accesses the data processing system via such a peripheral interface may thus send both memory write requests and memory read requests, seeking to access data held in the data processing system.

SUMMARY

In one example described herein there is a data processing system comprising:
  an interconnect comprising a system cache;
  a peripheral component coupled to the interconnect; and
  a memory coupled to the interconnect,
  wherein the peripheral component comprises a request ordering queue configured to queue received memory access requests in a receipt order, and wherein the peripheral component is configured to issue the memory access requests to the interconnect in the receipt order,
  wherein the peripheral component is configured to delay issuance of a memory read request of the memory access requests to the interconnect until a completion response for all memory write requests ahead of the memory read request in the memory access requests has been received from the interconnect,
  wherein the peripheral component is responsive to receipt of a memory read request to issue a memory read prefetch request comprising a physical address to the interconnect,
  and the interconnect is responsive to the memory read prefetch request to cause data associated with the physical address in the memory to be cached in the system cache.

In one example described herein there is a method of operating a data processing system comprising an interconnect coupled to a peripheral component and a memory, the interconnect comprising a system cache, the method comprising:
  queuing received memory access requests in a receipt order and issuing the memory access requests to the interconnect in the receipt order;
  delaying issuance of a memory read request of the memory access requests to the interconnect until a completion response for all memory write requests ahead of the memory read request in the memory access requests has been received from the interconnect;
  in response to receipt by the peripheral component of a memory read request, issuing a memory read prefetch request to the interconnect from the peripheral component; and
  in response to the memory read prefetch request, causing data associated with the physical address in the memory to be cached in the system cache.

In one example described herein there is a peripheral component for coupling to an interconnect comprising a system cache, wherein the peripheral component comprises:
  a request ordering queue configured to queue received memory access requests in a receipt order, and wherein the peripheral component is configured to issue the memory access requests to the interconnect in the receipt order,
  wherein the peripheral component is configured to delay issuance of a memory read request of the memory access requests to the interconnect until a completion response for all memory write requests ahead of the memory read request in the memory access requests has been received from the interconnect, and
  wherein the peripheral component is responsive to receipt of a memory read request to issue a memory read prefetch request comprising a physical address to the interconnect.

In one example described herein there is a method of operating a peripheral component coupled to an interconnect comprising a system cache, the method comprising: queuing received memory access requests in a receipt order and issuing the memory access requests to the interconnect in the receipt order; delaying issuance of a memory read request of the memory access requests to the interconnect until a completion response for all memory write requests ahead of the memory read request in the memory access requests has been received from the interconnect; in response to receipt by the peripheral component of a memory read request, issuing a memory read prefetch request to the interconnect from the peripheral component to cause the interconnect.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1A:
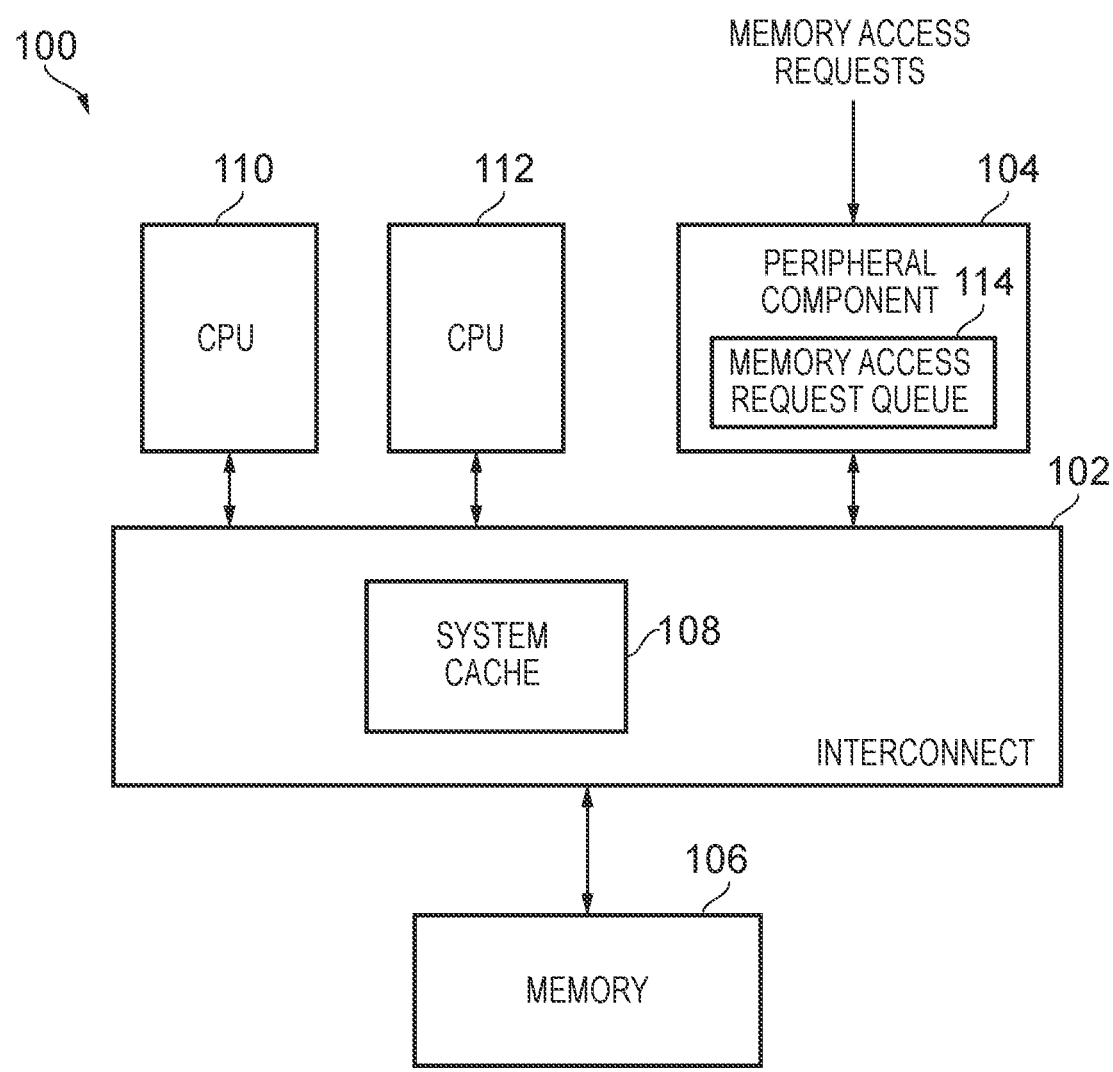
FIG. 1A schematically illustrates a data processing system in accordance with some examples.

Before discussing the embodiments with reference to the accompanying figures, the following description of embodiments is provided.

In accordance with one example configuration there is provided a data processing system comprising: an interconnect comprising a system cache; a peripheral component coupled to the interconnect; and a memory coupled to the interconnect, wherein the peripheral component comprises a request ordering queue configured to queue received memory access requests in a receipt order, and wherein the peripheral component is configured to issue the memory access requests to the interconnect in the receipt order, wherein the peripheral component is configured to delay issuance of a memory read request of the memory access requests to the interconnect until a completion response for all memory write requests ahead of the memory read request in the memory access requests has been received from the interconnect, wherein the peripheral component is responsive to receipt of a memory read request to issue a memory read prefetch request comprising a physical address to the interconnect, and the interconnect is responsive to the memory read prefetch request to cause data associated with the physical address in the memory to be cached in the system cache.

The memory request ordering constraint administered by the peripheral component, namely that a memory read request cannot be issued to the interconnect until a completion response has been received for all younger memory write requests (i.e. those which were received by the peripheral component before the memory read request) is in place because this provides a usefully straightforward mechanism to ensure that memory hazards do not arise, e.g. when a younger read access which targets a data item overtakes an older write access to that same data item and thus reads an incorrect (older) copy of the data item before it has been updated by the write access. Administering this memory request ordering constraint ensures that this cannot happen and does not require a more complex monitoring of specific read and write targets to be performed. Nevertheless, the inventors of the present techniques have realised that an opportunity exists to improve the handling of such memory read requests by a peripheral component coupled to an interconnect which comprises a system cache, by arranging the peripheral component such that a memory read request it receives causes a memory read prefetch request to be issued to the interconnect, which in turn causes the data which is the subject of the memory read request to be cached in the system cache. In turn this has the consequence that when the peripheral component finally issues the memory read request to the interconnect it is very likely that the data which is the subject of the memory read request is present in the system cache within the interconnect and can therefore be returned to the peripheral component very quickly. The memory read request latency is thus advantageously low, despite the peripheral component adhering to the memory request ordering constraint.

In some examples the peripheral component may receive the memory read request comprising a physical address which can be directly passed to the interconnect and if necessary onwards to the memory in order to access the relevant data, i.e. the physical address received already corresponds directly to the addressing mapping used by the memory. Alternatively, systems may be provided in which the translation of a virtual address specified in the memory read request takes place after the memory read request has been passed to the interconnect. However, in some examples the peripheral component receives memory read requests comprising virtual addresses, which must be translated into physical addresses before the memory read request is passed to the interconnect. In such examples the memory read request received by the peripheral component specifies a virtual address and the peripheral component is responsive to receipt of the memory read request to issue a translation request comprising the virtual address to the memory management unit, wherein the memory management unit is responsive to the translation request to return a translation of the virtual address into the physical address to the peripheral component, and wherein the peripheral component is responsive to the translation to issue the memory read prefetch request to the interconnect. The requirement to perform this address translation before the memory read request can be issued to the interconnect can indeed be a further time cost in the servicing of the memory read request by the peripheral component, potentially further adding to its completion latency. Accordingly, the approach proposed, of sending the translation request to the memory management unit whilst the memory read request is queued in the peripheral component, enables this address translation latency to be hidden by the timespan which the memory read request spends in the peripheral component queue.

In some such examples the peripheral component is configured additionally to require a number of memory access requests ahead of the memory read request in the request ordering queue to be less than a predetermined number to issue the translation request to the memory management unit. This approach coordinates the timing of the issuance of the translation request with the proximity of the memory read request from the front of the request ordering queue, such that the translation request is not issued unnecessarily early and leaving the memory management unit to perform other translations until it is actually needed to perform the address translation for the memory read request.

In some examples the peripheral component is configured additionally to require a minimum number of memory access requests to be ahead of the memory read request in the request ordering queue to issue the memory read prefetch request to the interconnect. This approach recognises the lead time which the memory read prefetch request will typically require to complete and therefore that for the relevant data item to be pre-cached in the interconnect's system cache, in advance of the peripheral component issuing the memory read request to the interconnect, the memory read prefetch request should be issued more than a certain minimum time in advance of the memory read request. When this time is likely not available, because the memory read request is already too close to the front of the peripheral component memory access request queue, then the benefit of issuing the memory read prefetch request may not be realised and so these examples provide that the memory read prefetch request is then not issued.

It is recognised that the interconnect may couple to an arbitrary number of components which share access to the memory and for the benefit of which therefore data may be held in the system cache in the interconnect. Where at least one of these further components coupled to the interconnect may comprise its own cache (or caches), it is also recognised that pre-caching the relevant data item in the system cache in response to the memory read prefetch request may also be brought about by retrieval of the relevant data item from another cache within the data processing system. This is particularly the case where the interconnect is a cache coherent interconnect and the currently valid copy of a given data item may be present in another cache of the data processing system. Accordingly, in some examples the data processing system further comprises at least one cache coupled to the interconnect, wherein the interconnect is configured to administer a cache coherency policy with respect to the at least one cache and the system cache, and wherein the interconnect is responsive to the memory read prefetch request, when the data associated with the physical address in the memory is currently validly cached in one of the at least one cache, to cause the data to be copied into the system cache.

In some such examples, the interconnect is responsive to a memory read request targeting the physical address, when copying of the data currently validly cached in one of the at least one caches into the system cache is still in-flight, to cause the data associated with the physical address in the memory to be returned in response to the memory read request once the copying completes. This then provides the up-to-date copy of the data in response to the memory read request.

In some examples, the interconnect is configured to perform a look-up in the system cache on the basis of the physical address, and when a cache miss results from the look-up the interconnect is configured to issue a prefetch memory read request targeting the physical address in the memory.

In some examples, the interconnect is responsive to a memory read request targeting the physical address, when the prefetch memory read request targeting the physical address in the memory which it issued is still in-flight, to cause the data associated with the physical address in the memory to be returned in response to the memory read request once the prefetch memory read request completes. Rather than allowing the memory read request to also be sent on to the memory, chasing the prefetch memory read request, this provides an efficient approach in which the memory read request can be paused in the interconnect pending the return of data retrieved by the prefetch memory read request.

In some examples, the interconnect is responsive to a memory read request targeting the physical address, when the prefetch memory read request targeting the physical address in the memory is still held in a queue for issuance, to cancel the prefetch memory read request and to issue the memory read request targeting the physical address. This avoids two parallel and essentially identically read requests being further transmitted to the memory. Moreover, since the memory read request has "caught up with" the prefetch memory read request, the latter then has no further purpose since it was created as a direct result of handling the memory read request.

In some examples, the interconnect is responsive to a memory read request targeting the physical address, when the prefetch memory read request targeting the physical address in the memory is issued but not yet complete, not to issue the memory read request targeting the physical address, and to await the return of the data resulting from the prefetch memory read request. Rather than allowing the memory read request to also be sent on to the memory, chasing the prefetch memory read request, this provides an efficient approach in which the memory read request can be paused in the interconnect pending the return of data retrieved by the prefetch memory read request.

In some examples, the interconnect is configured to perform a look-up in the system cache on the basis of the physical address, and when a cache hit results from the look-up the interconnect is configured to modify an eviction priority for the data associated with the physical address in the memory which is cached in the system cache. Modifying the eviction priority for the data cached in the system cache, in particular lowering its eviction priority, improves the chance that the data will still be cached in the system cache when the memory read request is issued from the peripheral component to the interconnect and thus that the memory read request can be very promptly serviced by the interconnect.

The modification of the eviction priority for the data associated with the physical address cached in the system cache may take a variety of forms, but in some such examples the interconnect is configured to minimise the eviction priority for the data associated with the physical address in the memory which is cached in the system cache. In some such examples the interconnect is configured to store a do-not-evict-until-read marker in association with the data associated with the physical address in the memory which is cached in the system cache.

In some examples the interconnect is responsive to a memory read request targeting the physical address to cause the data associated with the physical address in the memory which is cached in the system cache to be returned.

The peripheral component may take a variety of forms, but in some examples the peripheral component coupled to the interconnect comprises an interface configured to operate in compliance with the Peripheral Component Interconnect Express (PCIe) standard.

In accordance with one example configuration there is provided a method of operating a data processing system comprising an interconnect coupled to a peripheral component and a memory, the interconnect comprising a system cache, the method comprising: queuing received memory access requests in a receipt order and issuing the memory access requests to the interconnect in the receipt order; delaying issuance of a memory read request of the memory access requests to the interconnect until a completion response for all memory write requests ahead of the memory read request in the memory access requests has been received from the interconnect; in response to receipt by the peripheral component of a memory read request, issuing a memory read prefetch request to the interconnect from the peripheral component; and in response to the memory read prefetch request, causing data associated with the physical address in the memory to be cached in the system cache.

In accordance with one example configuration there is provided a peripheral component for coupling to an interconnect comprising a system cache, wherein the peripheral component comprises: a request ordering queue configured to queue received memory access requests in a receipt order, and wherein the peripheral component is configured to issue the memory access requests to the interconnect in the receipt order, wherein the peripheral component is configured to delay issuance of a memory read request of the memory access requests to the interconnect until a completion response for all memory write requests ahead of the memory read request in the memory access requests has been received from the interconnect, and wherein the peripheral component is responsive to receipt of a memory read request to issue a memory read prefetch request comprising a physical address to the interconnect.

In some examples the memory read request received by the peripheral component specifies a virtual address and the peripheral component is responsive to receipt of the memory read request to issue a translation request comprising the virtual address to a memory management unit coupled to the interconnect, wherein the memory management unit is responsive to the translation request to return a translation of the virtual address into the physical address to the peripheral component, and wherein the peripheral component is responsive to a translation of the virtual address into the physical address returned from the memory management unit to issue the memory read prefetch request to the interconnect.

In some examples the peripheral component is configured additionally to require a number of memory access requests ahead of the memory read request in the request ordering queue to be less than a predetermined number to issue the translation request to the memory management unit.

In some examples the peripheral component is configured additionally to require a minimum number of memory access requests to be ahead of the memory read request in the request ordering queue to issue the memory read prefetch request to the interconnect.

In some examples the peripheral component coupled to the interconnect comprises an interface configured to operate in compliance with the Peripheral Component Interconnect Express (PCIe) standard.

In accordance with one example configuration there is provided a method of operating a peripheral component coupled to an interconnect comprising a system cache, the method comprising: queuing received memory access requests in a receipt order and issuing the memory access requests to the interconnect in the receipt order; delaying issuance of a memory read request of the memory access requests to the interconnect until a completion response for all memory write requests ahead of the memory read request in the memory access requests has been received from the interconnect; in response to receipt by the peripheral component of a memory read request, issuing a memory read prefetch request to the interconnect from the peripheral component to cause the interconnect.

Particular embodiments will now be described with reference to the figures.

FIG. 1A illustrates a data processing system 100 in accordance with some examples. The system comprises an interconnect 102 which couples to a number of different components and together they form the data processing system. A peripheral component 104 is coupled to the interconnect 102 and (as illustrated) receives inbound memory access requests (i.e. from a further non-illustrated agent). Two CPUs 110 and 112 are also coupled to the interconnect. Generally, memory access requests, whether received by the peripheral component 104 or generated by one of the two CPUs 110, 112 are issued to the interconnect 102, wherein the ultimate target of these memory requests is the memory 106 which is also coupled to the interconnect 102. However, the interconnect 102 also comprises a system cache 108 arranged to cache data lines retrieved from the memory, such that do not need to be retrieved from the memory (and thus incur the associated access latency) each time those cached data lines are the subject of a memory access request. The peripheral component 104 further comprises a memory access request queue in which inbound memory access requests are queued prior to being issued to the interconnect 102. A particular feature of the configuration of this memory access request queue 114 and the way that it is administered by the peripheral component 104 is that a memory read request in the queue cannot be issued to the interconnect until a completion notification has been received for all older memory write requests (i.e. memory write requests which were received by the peripheral component 104 before the memory read request). This ensures that data hazards are avoided. However, this approach also carries the potential for undesirable completion latency to be associated with such memory read requests. In order to mitigate against such completion latency, the present techniques (as will be described in more detail below with reference to the figures which follow) propose an approach according to which a memory read prefetch request is issued to the interconnect 102 by the peripheral component 104 whilst the corresponding memory read request is still held in the memory access request queue 114 behind older memory write requests which have not yet completed. The issuance of this memory read prefetch request causes the target data of the memory read request to be pre-cached in the system cache 108, meaning that when the memory read request does reach the front of the memory access request queue 114 and can be issued to the interconnect 102, the target data can be promptly returned, thus avoiding further memory access latency and allow the peripheral component 104 to respond to inbound memory read request faster than in the absence of the present techniques.

Figure 1B:
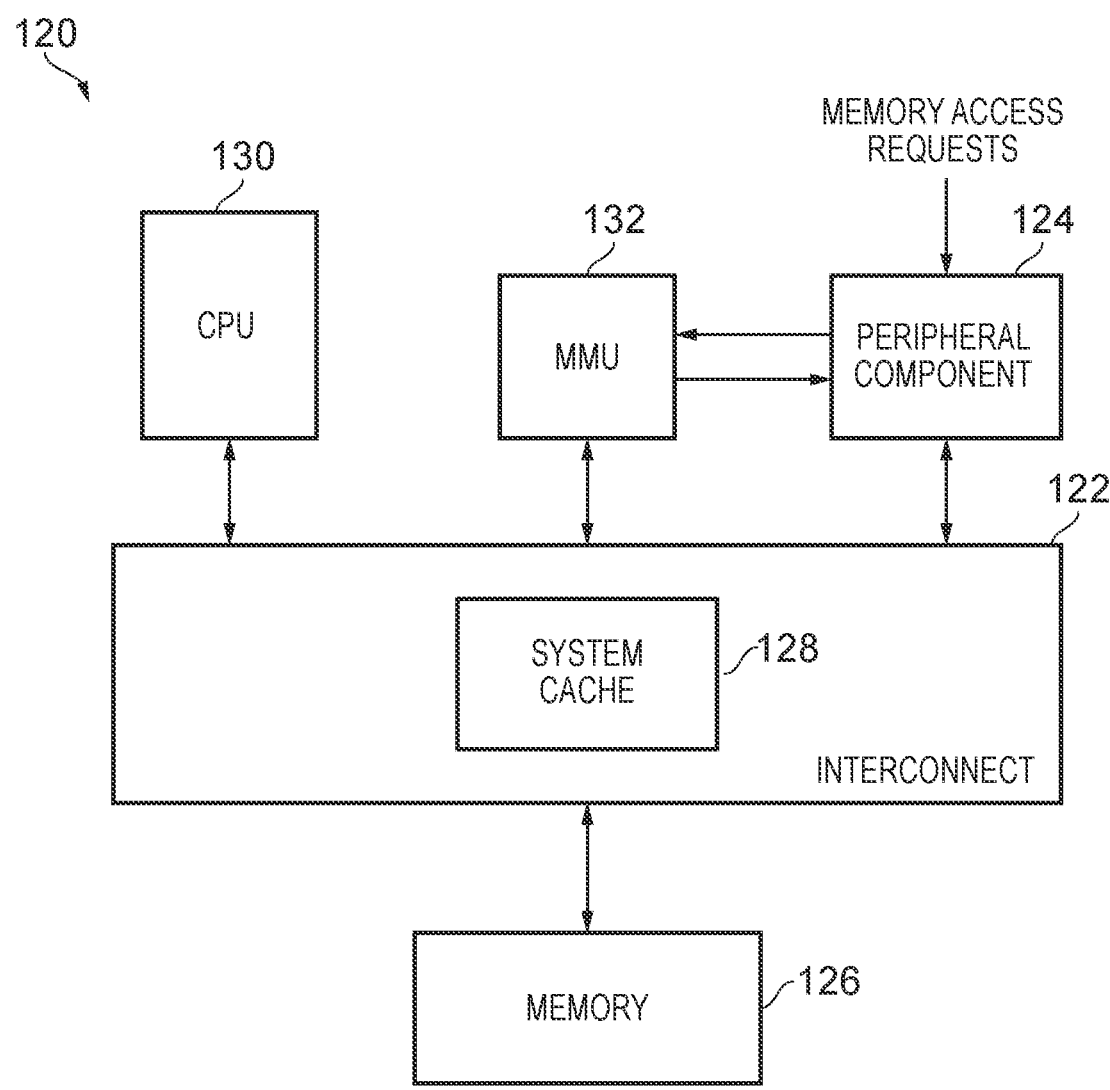
FIG. 1B schematically illustrates a data processing system in accordance with some examples.

FIG. 1B illustrates another data processing system 120 in accordance with some examples. The system comprises an interconnect 122 which couples to a number of different components and together they form the data processing system. A peripheral component 124 is coupled to the interconnect 122 and (as illustrated) receives inbound memory access requests (i.e. from a further non-illustrated agent). A CPU 130 and an MMU 122 are also coupled to the interconnect. As described above with reference to the similar example of FIG. 1A, memory access requests, whether received by the peripheral component 124 or generated by the CPU 130 are issued to the interconnect 122, with the ultimate target of these memory requests being the memory 126 which is also coupled to the interconnect 122. Interconnect 122 also comprises a system cache 128. Note that in this example the peripheral component 124 can also communicate with the MMU 132. In particular, the peripheral component 124 can issue an address translation request to the MMU 132 for a virtual address associated with a memory access request and receive a physical address translation in return. Accordingly, the peripheral component 124 can thereby receive memory access requests which specify virtual addresses and issue memory access requests which specify physical addresses to the interconnect 122. As in the case of the example shown in FIG. 1A, the peripheral component 124 also comprises a memory access request queue (not explicitly illustrated) in which inbound memory access requests are queued prior to being issued to the interconnect 122. The peripheral component 124 thus operates in the same manner as described above for the peripheral component 104 in FIG. 1A, with the additional step that before the peripheral component 124 can issue a memory access request to the interconnect 122 it must first request a corresponding address translation from the MMU 132 and receive the address translation in return. As will be described in more detail below with reference to the figures which follow, the peripheral component 124 (as described above for the FIG. 1A example) also issues a memory read prefetch request to the interconnect 104 in advance of the corresponding memory read request reaching the front of its memory access request queue and being issued itself to the interconnect 122.

Figure 2A:
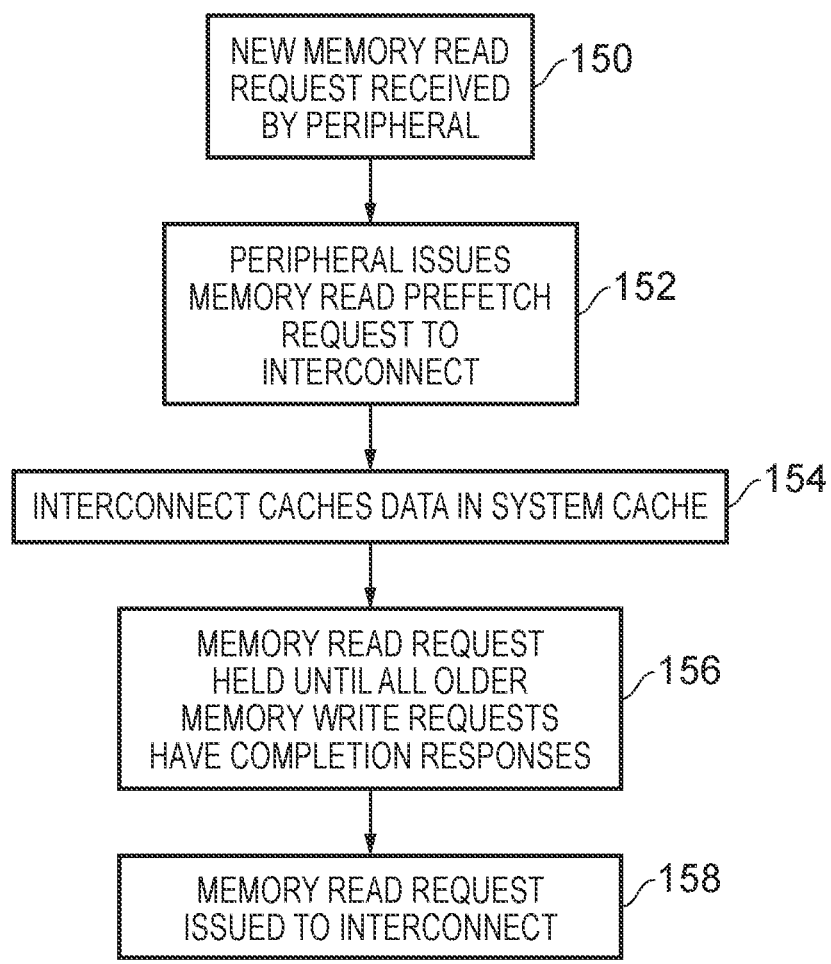
FIG. 2A is a flow diagram illustrating a sequence of steps which are taken in accordance with the method of some examples.

FIG. 2A is a flow diagram illustrating a sequence of steps which are taken in accordance with the method of some examples. At step 150 a new memory read request is received by the peripheral component. On the basis of this memory read request the peripheral component then issues a memory read prefetch request to the interconnect at step 152. As a result of the memory read prefetch request the interconnect causes the target data to be cached in the system cache of the interconnect. At step 156 the memory read request is held queued by the peripheral component until completion responses have been received for all older memory write requests which the peripheral component has issued and then at step 158 the memory read request is issued to the interconnect. It will thus be understood that the sequence of steps taken as shown in FIG. 2A broadly correspond to an example such as that illustrated in FIG. 1A, for which no address translation for the requests handled by the peripheral component is required.

Figure 2B:
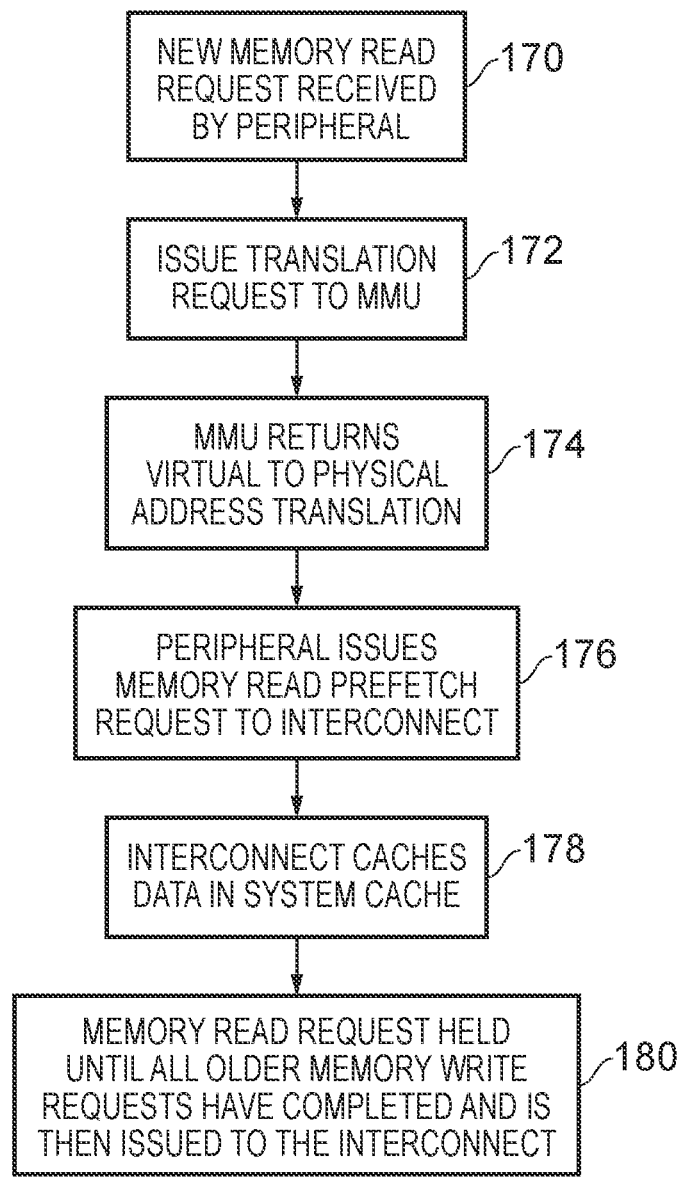
FIG. 2B is a flow diagram illustrating a sequence of steps which are taken in accordance with the method of some examples.

FIG. 2B is a flow diagram illustrating a sequence of steps which are taken in accordance with the method of some examples. At step 170 a new memory read request is received by the peripheral component. The memory read request specifies a virtual address and hence at step 172 the peripheral component issues a translation request to a memory management unit (MMU). In response at step 174 the MMU returns the corresponding virtual to physical address translation. Then at step 176 the peripheral component issues a memory read prefetch request to the interconnect comprising the translated physical address. In response to this at step 178 the interconnect caches the data corresponding to that physical address in the system cache. At step 180 the memory read request is held queued by the peripheral component until completion responses have been received for all older memory write requests which the peripheral component has issued and then the memory read request is issued to the interconnect. It will thus be understood that the sequence of steps taken as shown in FIG. 2B broadly correspond to an example such as that illustrated in FIG. 1B, for which address translation for the requests handled by the peripheral component is required.

Figure 3:
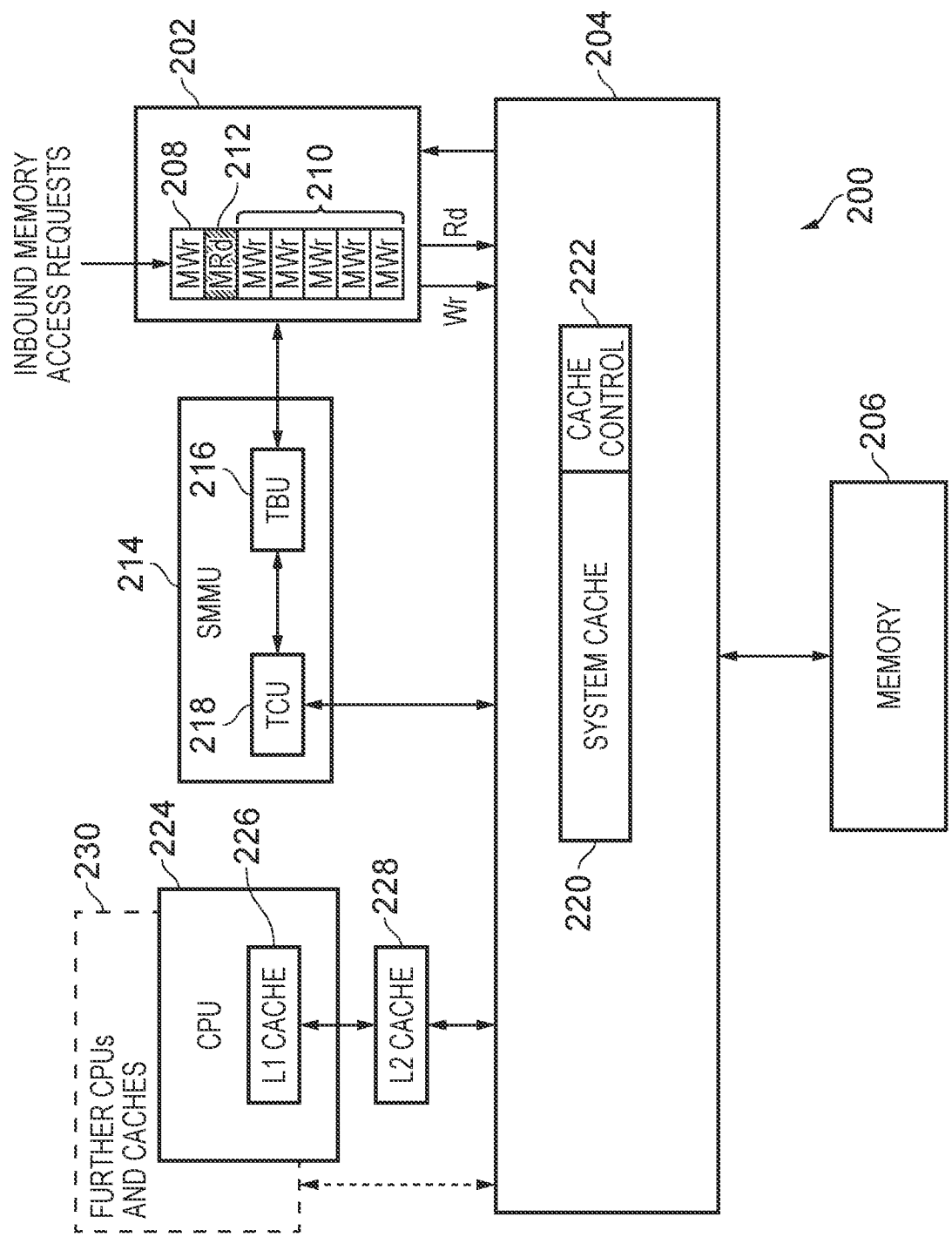
FIG. 3 schematically illustrates a data processing system in accordance with some examples.

FIG. 3 schematically illustrates a data processing system 200 in accordance with some examples. The data processing system 200 comprises a peripheral component 202 coupled to an interconnect 204 via which it can provide access to a memory 206. The peripheral component 202 is arranged to receive inbound memory access requests which it queues in a memory access queue 208. The peripheral component 202 has a write channel and a read channel via which it issues memory access requests to the interconnect 204, however the sending of these read and write memory access requests is not entirely independent, since the peripheral component 202 is constrained not to issue a memory read request to the interconnect 204 until a completion response has been received for all memory write requests which are older than (i.e. received before) that memory read request. The memory access request queue 208 is shown with the queued requests in FIFO order and hence the set of memory write requests 210, which are older than the memory read request 212, must all complete before the memory read request 212 can be issued. The data processing system 200 further comprises a system memory management unit (SMMU) 214, which provides address translation services to the system components. The peripheral component 202 can communicate with the SMMU 214 and in particular can issue a translation request corresponding to a memory access request queued in its memory access queue 208. Accordingly, will be understood that the peripheral component 202 receives the inbound memory access requests specifying virtual addresses, for each of which an address translation is required, such that the memory access requests can be forwarded to the interconnect each specifying a corresponding physical address (i.e. in the memory mapping used in the memory 206). An address translation request received by the SMMU 214 is first looked up in a translation lookaside buffer unit (TBU) 216, which caches recent address translations. The address translation is either then returned in the case of the hit, although request is then passed to a translation control unit (TCU) 218, which controls a page walk process by means of which the address translation is retrieved, ultimately from a corresponding page table stored in memory 206 (though possibly cached in the system cache 220). One of ordinary skill in the art is familiar with such an address translation process including a page walk process and further description thereof is omitted here for conciseness. Once the peripheral component 202 has received an address translation, a queued memory access request could in principle be issued to the interconnect 204. However, in the case of a memory read request (an example 212 is shown in the memory access queue 208) it cannot be issued to the interconnect 204 until all older memory write requests have completed. In the example illustration of FIG. 3 a set of older memory write requests 210 are shown to be ahead of the memory read request 212. Nevertheless, in accordance with the present techniques the peripheral component 202 is arranged, once the address translation for a queued memory read request has been received, to issue a memory read prefetch request comprising the translated physical address for the queued memory request to the interconnect 204. This causes the interconnect 204 to cause the target data (i.e. that data which is associated with the translated physical address) to be copied into the system cache 220. Then, when the memory read request 212 is released to be issued to the interconnect 204 (i.e. when completion responses for the set of memory write request 210 have been received), the memory read request can promptly return the target data, because it has been pre-cached in the system cache 220.

It should be noted that the target data may be caused to be pre-cached in the system cache 220 via a number of mechanisms, some or all of which may be provided by examples of the present techniques. For example, in the case of the data processing system 200, a memory read prefetch request handled by the interconnect 204 firstly causes a lookup in the system cache 220 to be carried out. If this results in hit then the memory read prefetch request is complete, since the target data is already present in the system cache 220. As a further step, under the control of the cache control 222, the eviction priority of the cache line containing the target data may be modified and in particular may be minimised, i.e. to make it as likely as possible that this cache line will still be present in the cache when the subsequent memory read request is handled by the interconnect 204. Indeed, in some examples the cache line may be marked as "do not evict until read" in order to further support this approach. If the lookup in the system cache 220 misses, then the cache control 222 is arranged to cause the required cache line to be copied into the system cache 220. Generally speaking, this may be achieved by retrieving the data line from memory 206. However, in some examples such as that shown in FIG. 3 other master devices may be coupled to the interconnect 204. FIG. 3 shows an example of such a master device in the form of a CPU 224. Note in particular that the CPU 224 comprises its own level 1 cache 226 and level 2 cache 228. Further such CPUs and caches 230 may also be coupled to the interconnect 204. The cache control 222 is configured to administer a cache coherency protocol, i.e. interconnect 204 is a cache coherent interconnect, such that the cache control 222 provides hardware management of the required coherency. As such, the target data which is the subject of the memory read prefetch request may form part of a cache line of which the currently valid version may be held in any of the caches in the cache coherent system one. Consequently, when the lookup triggered by memory read prefetch request in the system cache 220 misses, the required cache line may be currently held by another cache in the system such as L1 cache 226 or L2 cache 228, and the cache control 222 then causes that cache line to be copied from that other cache into the system cache 220.

Figure 4:
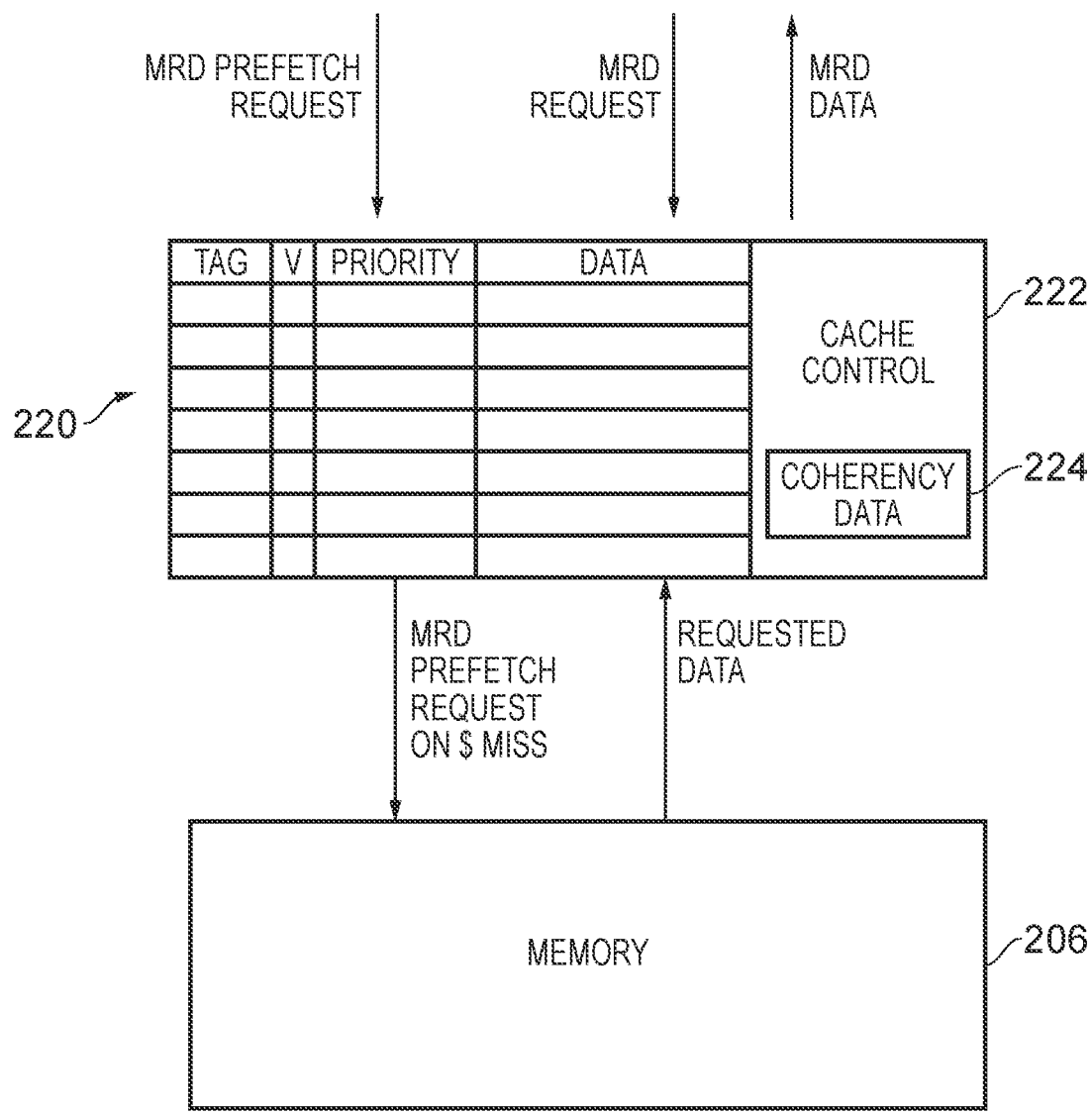
FIG. 4 schematically illustrates a system cache and memory and some signals which they respectively receive and transmit in accordance with some examples.

FIG. 4 schematically illustrates the system cache 220, the memory 206 and some signals which they respectively receive and transmit in accordance with some examples. A memory read (MRD) prefetch request received by the system cache 220 causes a cache lookup to be performed. If the relevant cache line is already present in the system cache 220 then no further retrieval of data is required. If however the lookup results in a cache miss, then the cache control 222 is arranged to control processes which cause the cache line to be copied into the cache 220. As part of its configuration the cache control 222 holds coherency data 224, which indicates which cache lines are currently held by other caches in this cache coherent system (e.g. L1 cache 226 and L2 cache 228). In a case where the required cache line is currently held by the cache in the system, the cache control 222 causes a copy of that cache line to be copied into the system cache 220. However, when the required cache line is not currently cached in any of the caches, the cache control 222 forwards the memory read prefetch request to the memory 206 in order for the cache line to be retrieved. The requested data is then returned from the memory 206 to the cache 220. By whatever mechanism at the relevant cache line is caused to be copied into the system cache 220 (or indeed if was already present there), the cache control 222 then modifies the eviction priority of the cache line to seek to ensure that this cache line will still be present in the cache 220 when the subsequent memory read request arrives. The eviction priority information may be variously configured, and in some examples the cache control 222 sets the eviction priority to a minimum (i.e. least likely to be evicted) or indeed some examples the cache control 222 stores an indicator as the eviction priority which corresponds to "do not evict until read". In administering further evictions from the cache control 222 will then avoid this cache line as a possible eviction candidate, until the line has been read (when its priority can be further modified to indicate that it may now be evicted). Accordingly, when a subsequent memory read (MRD) request is received by the cache 220 which comprises a target address which corresponds to this pre-cached cache line, the memory read (MRD) data can promptly be returned.

Figure 5:
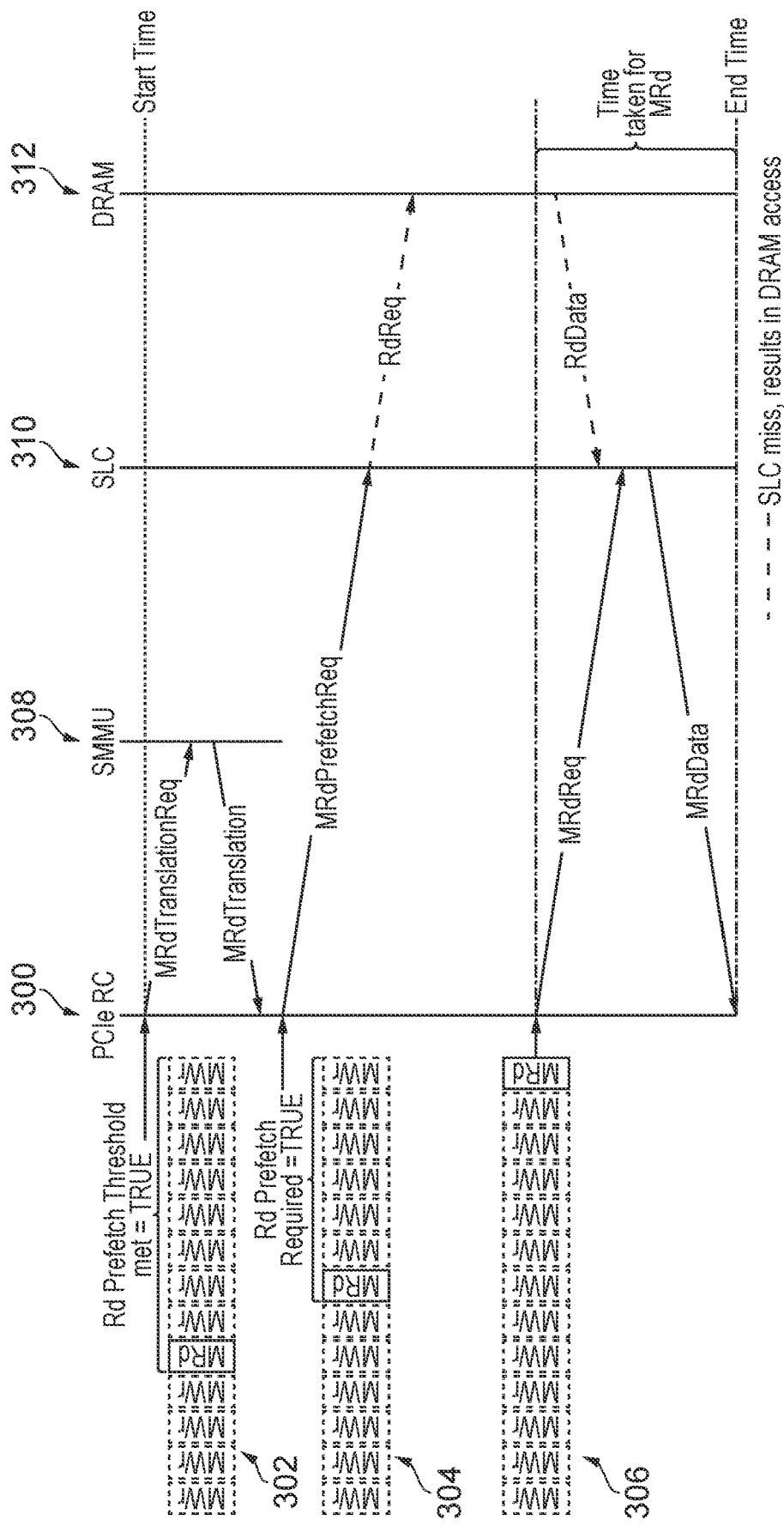
FIG. 5 illustrates a set of requests and responses which are exchanged between system components in response to a memory read request progressing through a memory access request queue in a peripheral component in accordance with some examples.

FIG. 5 illustrates a set of requests and responses which are exchanged between system components in response to a memory read request progressing through a memory access request queue in a peripheral component in accordance with some examples. A peripheral component (PCIe RC) 300 comprises a memory access request queue, which is shown in three stages of progression 302, 304, 306 as the peripheral component 300 handles memory access requests. At an initial stage 302, the memory access queue (which is shown with the oldest items on the right, youngest on the left) has eight memory write requests (MWr) ahead of a memory read request (MRd), and this number of older memory access requests is determined to be less than a preset maximum ("Rd Prefetch Threshold") such that a memory translation request ("MRdTranslationReq") can be triggered. The peripheral component 300 then issues this translation request to the system MMU (SMMU) 308, which responds with the required address translation ("MRdTranslation"). Once this address translation has been received, and at stage 304 when a prefetch condition specifying that a minimum number of other memory access requests is still ahead of the memory read request is determined to be true ("Rd Prefetch Required"), the peripheral component 300 issues a corresponding memory read prefetch request ("MRdPrefetchReq") to the interconnect. This memory read prefetch request is received by the system cache (SLC) 310. In the situation illustrated, this prefetch request misses in the SLC 310 and hence the SLC 310 forwards a read request ("RdReq") to the memory (DRAM) 312. This read request then progresses in the memory system. Meanwhile the memory access queue in the peripheral component 300 progresses to the stage 306 at which the memory read request has reached the front of the queue. The peripheral component 300 then issues a memory read request ("MRdReq") to the interconnect. By the time this is received by the system cache 310, the read data ("RdData") has been returned from the memory 312 and cached in the system cache 310, and hence in response to the memory read request ("MRdReq") the system cache can promptly return the requested data in response ("MRdData").

Figure 6:
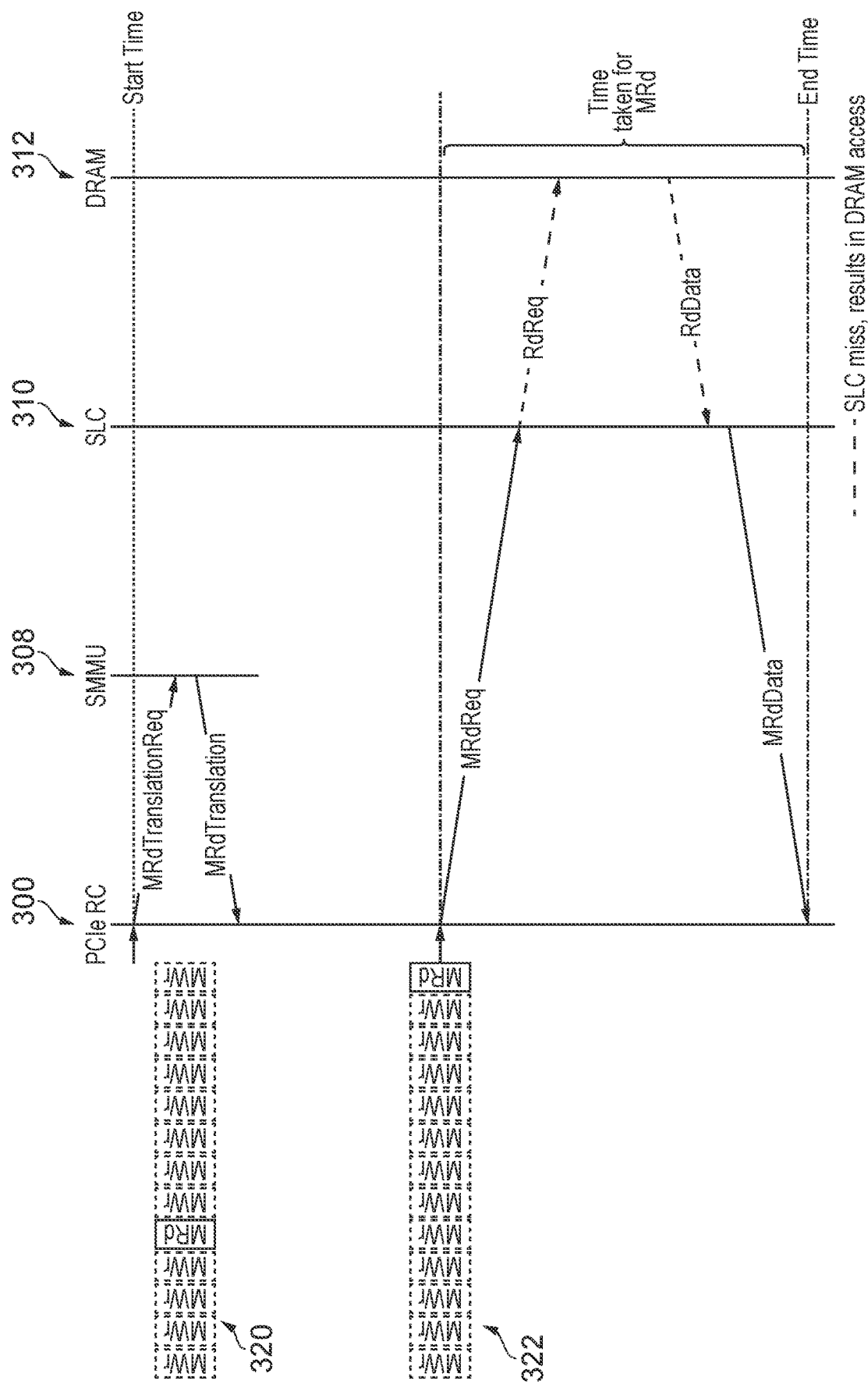
FIG. 6 is a comparative example with respect to FIG. 5, showing a set of requests and responses which are exchanged between system components in the absence of the present techniques.

FIG. 6 is a comparative example with respect to FIG. 5, showing a set of requests and responses which are exchanged between system components in the absence of the present techniques. The example peripheral component (PCIe RC) 300 is again shown, whereby its memory access request queue is shown in two stages of progression 320 and 322. At the initial stage 320, the memory access queue (again shown with the oldest items on the right, youngest on the left) again has eight memory write requests (MWr) ahead of the memory read request (MRd). The peripheral component 300 issues a translation request for this memory read request to the system MMU (SMMU) 308, which responds with the required address translation ("MRdTranslation"). However, regardless of when this address translation is returned, the peripheral component 300 must then wait until the memory read request has reached the front of the queue before it can issue the memory read request ("MRdReq") to the interconnect. This is shown as stage 322 of the queue. Where the target data is not cached in the system cache 310, this causes the SLC 310 to forwards a read request ("RdReq") to the memory (DRAM) 312. This read request then progresses in the memory system. Only once the required read data ("RdData") has been returned from the memory 312 can the system cache 310 respond to the memory read request and return the requested data in response ("MRdData"). By comparison with the timings of FIG. 5, it can be seen that servicing the memory read request in the example of FIG. 6 takes notably longer.

Figure 7:
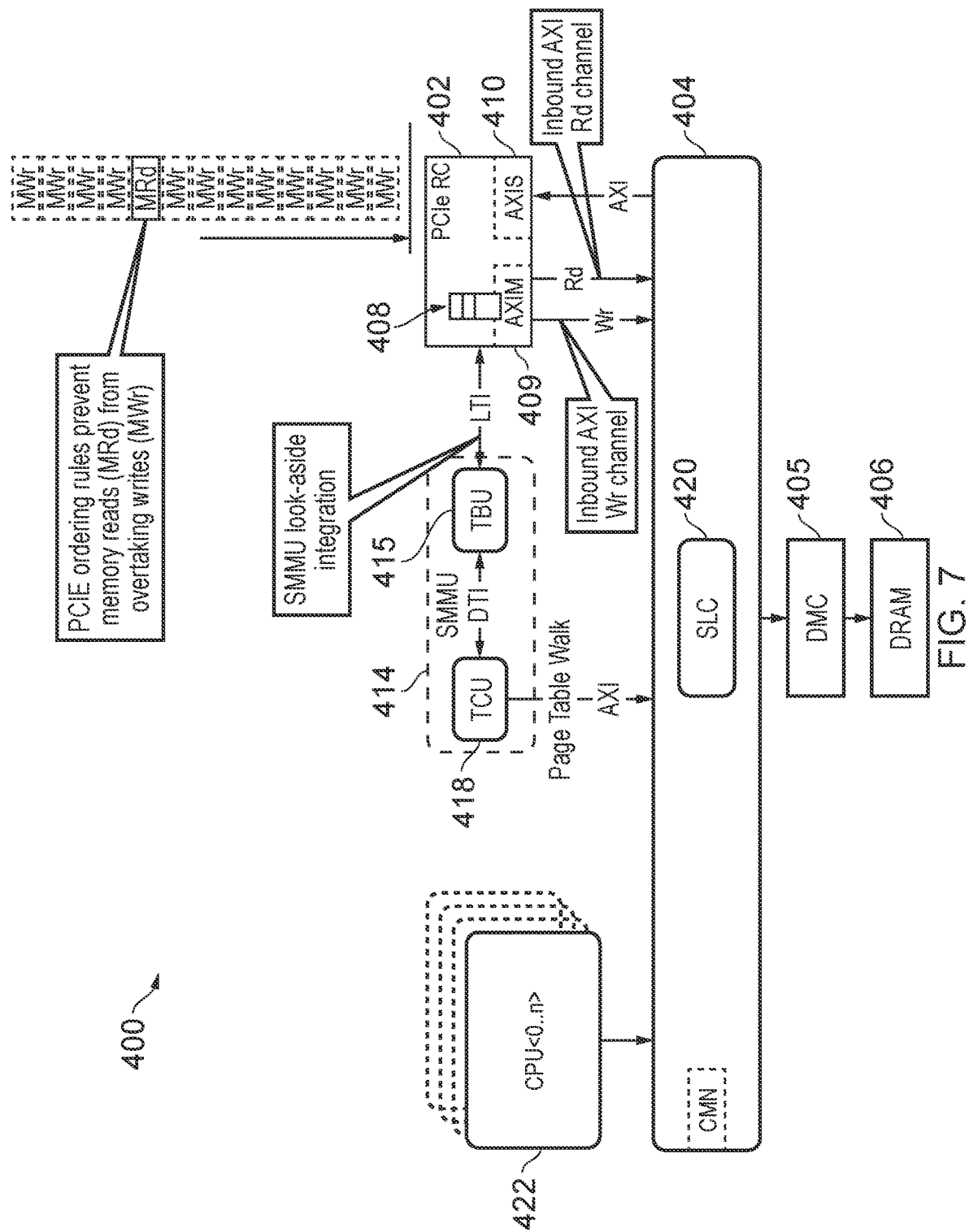
FIG. 7 schematically illustrates a data processing system in accordance with some examples.

FIG. 7 schematically illustrates a data processing system 400 in accordance with some examples. The data processing system 400 comprises a peripheral component (PCIe RC) 402 coupled to an interconnect (CMN) 404 via which it can provide access to a memory (DRAM) 406, via memory controller (DMC) 405. In this example the interconnect is a coherent mesh network as provided by Arm Limited, Cambridge, UK. The PCIe RC 402 is arranged to receive inbound memory access requests which it queues in a memory access queue 408. The PCIe RC 402 has both a master interface (AXIM) 409 and a slave interface (AXIS) 410 coupling it to the interconnect 404. The master interface 409 provides both an inbound AXI write channel and an inbound AXI read channel for conveying corresponding memory write/read access requests to the interconnect 404. Requested data is returned via the slave interface 410. The PCIe RC 402 is constrained not to issue a memory read request to the interconnect 404 until a completion response has been received for all memory write requests which are older than (i.e. received before) that memory read request. The data processing system 400 further comprises a system memory management unit (SMMU) 414, which provides address translation services to the system components. The PCIe RC 402 can communicate with the SMMU 414 and in particular has a local translation interface (LTI) via which it can issue a translation request to the SMMU 414 corresponding to a memory access request queued in its memory access queue 408. An address translation request received by the SMMU 414 is first looked up in a translation lookaside buffer unit (TBU) 415, which caches recent address translations. The address translation is either then returned in the case of the hit, although request is then passed to a translation control unit (TCU) 418, which controls a page walk process by means of which the address translation is retrieved, ultimately from a corresponding page table stored in memory 406 (though possibly cached in the system cache 420). One of ordinary skill in the art is familiar with such an address translation process including a page walk process and further description thereof is omitted here for conciseness. In the manner described above with reference to FIG. 5, once the PCIe RC 402 has received the address translation, it can (subject to any queue depth threshold applied) issue a memory read prefetch request comprising the translated physical address for the queued memory request to the interconnect 404. This causes the interconnect 404 to cause the target data (i.e. that data which is associated with the translated physical address) to be copied into the system cache 420. As described above, this might be by reading the data from DRAM 406, or may be achieved by coping the cache line from a cache associated with another system component, such as the set of CPUs 422. This pre-caching of the required cache line means that when the corresponding memory read request reaches the front of the queue 408 and is issued to the interconnect 404 (i.e. when completion responses for any older memory write requests have been received), the memory read request can promptly return the target data, because it has been pre-cached in the system cache 420.

Figure 8A:
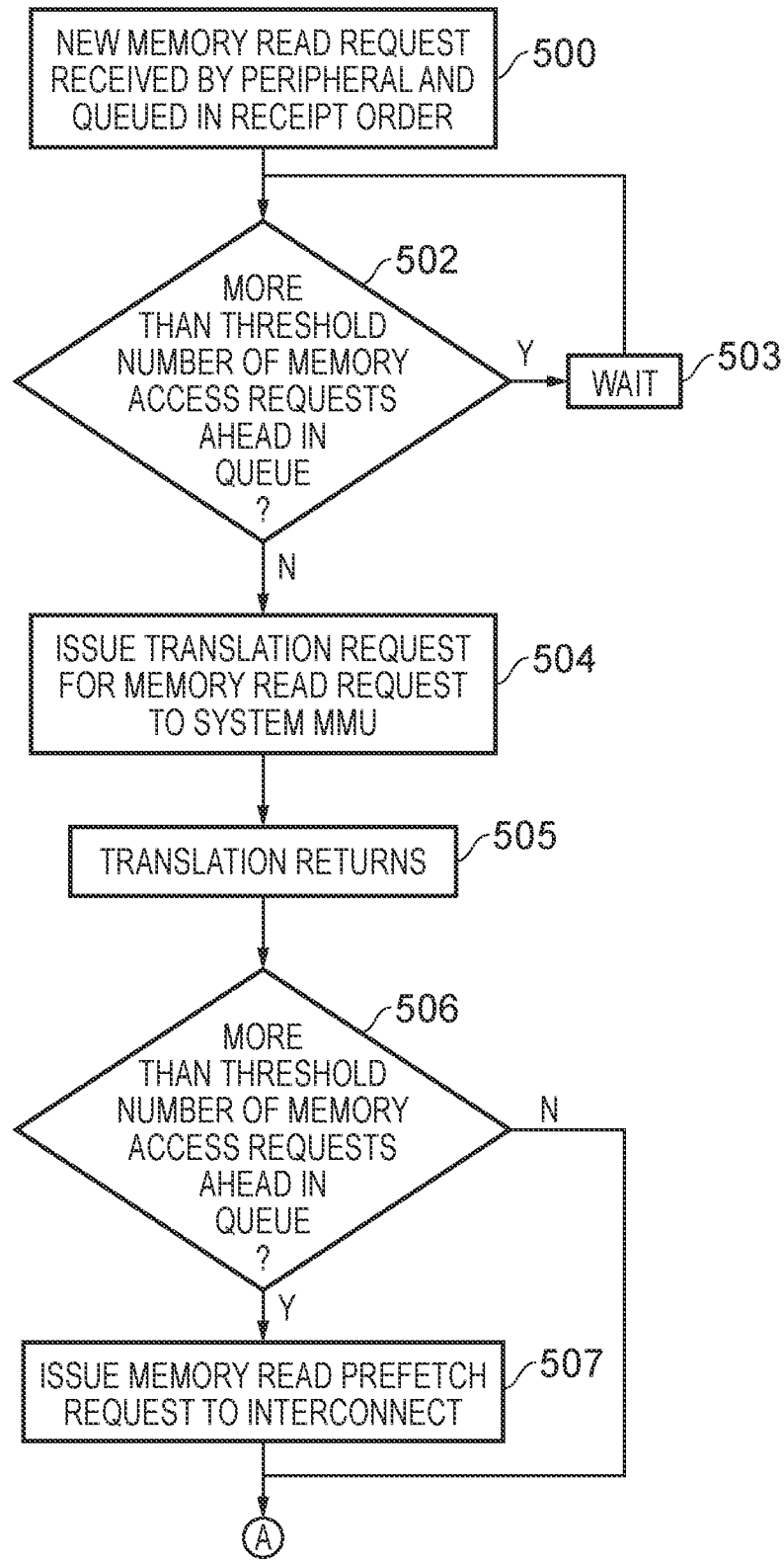
FIGS. 8A and 8B illustrate a flow diagram showing a sequence of steps which are taken by a peripheral component in accordance with the method of some examples.
Figure 8B:
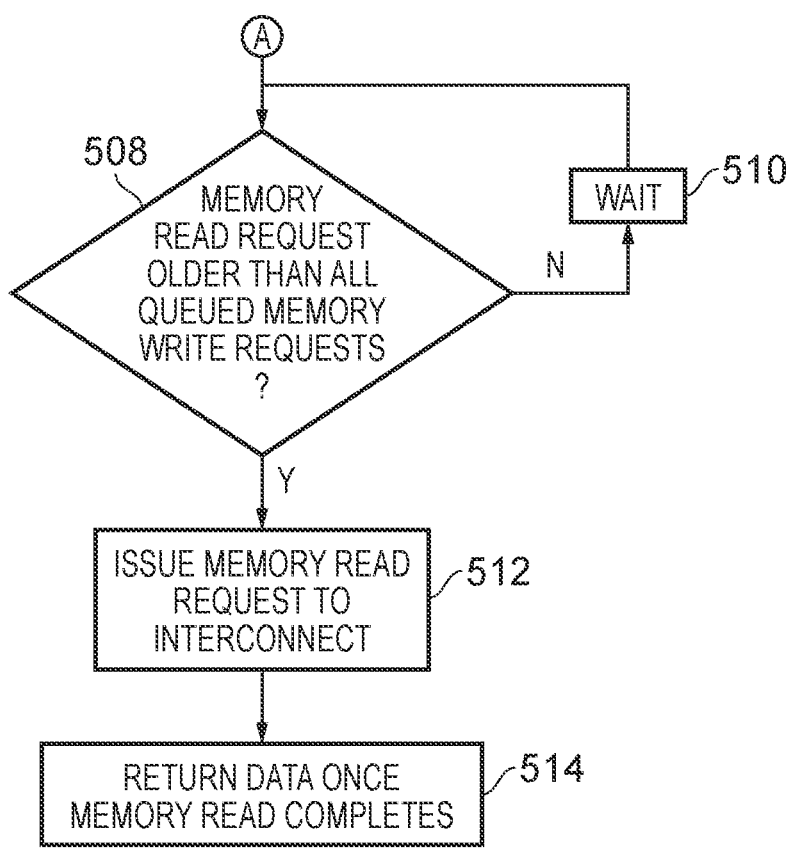

FIGS. 8A and 8B illustrate a flow diagram showing a sequence of steps which are taken by a peripheral component in accordance with the method of some examples. The process begins at step 500 when a new memory read request is received by the peripheral component and is queued in receipt order. Then at step 502 it is determined with respect to the memory access request queue whether there are currently more than a threshold number of memory access requests ahead of this memory read request in the queue. When this is true the flow proceeds via step 503 for a wait period before testing the condition again. When the threshold number of memory access requests (or fewer) ahead of the memory read request in the queue is reached, then at step 504 the peripheral component issues a translation request for the memory read request to the system MMU. Thereafter at step 505 the address translation returns. Then at step 506 it is determined whether there are currently more than a threshold number of memory access requests ahead of the memory read access request in the queue. When this is the case the flow proceeds to step 507, where a corresponding memory read prefetch request is issued to the interconnect. Otherwise step 507 is skipped. Then at step 508 it is determined whether the memory read request is now older than all queued memory write requests, i.e. that there are not any older memory write requests still queued. Until this is the case, the flow loops on itself by wait step 510. When this is true the flow proceeds to step 512 in the memory read request is issued to the interconnect. Once the data is returned to the peripheral component in response to the memory read request, this data can be returned to the source of the memory read request.

Figure 9:
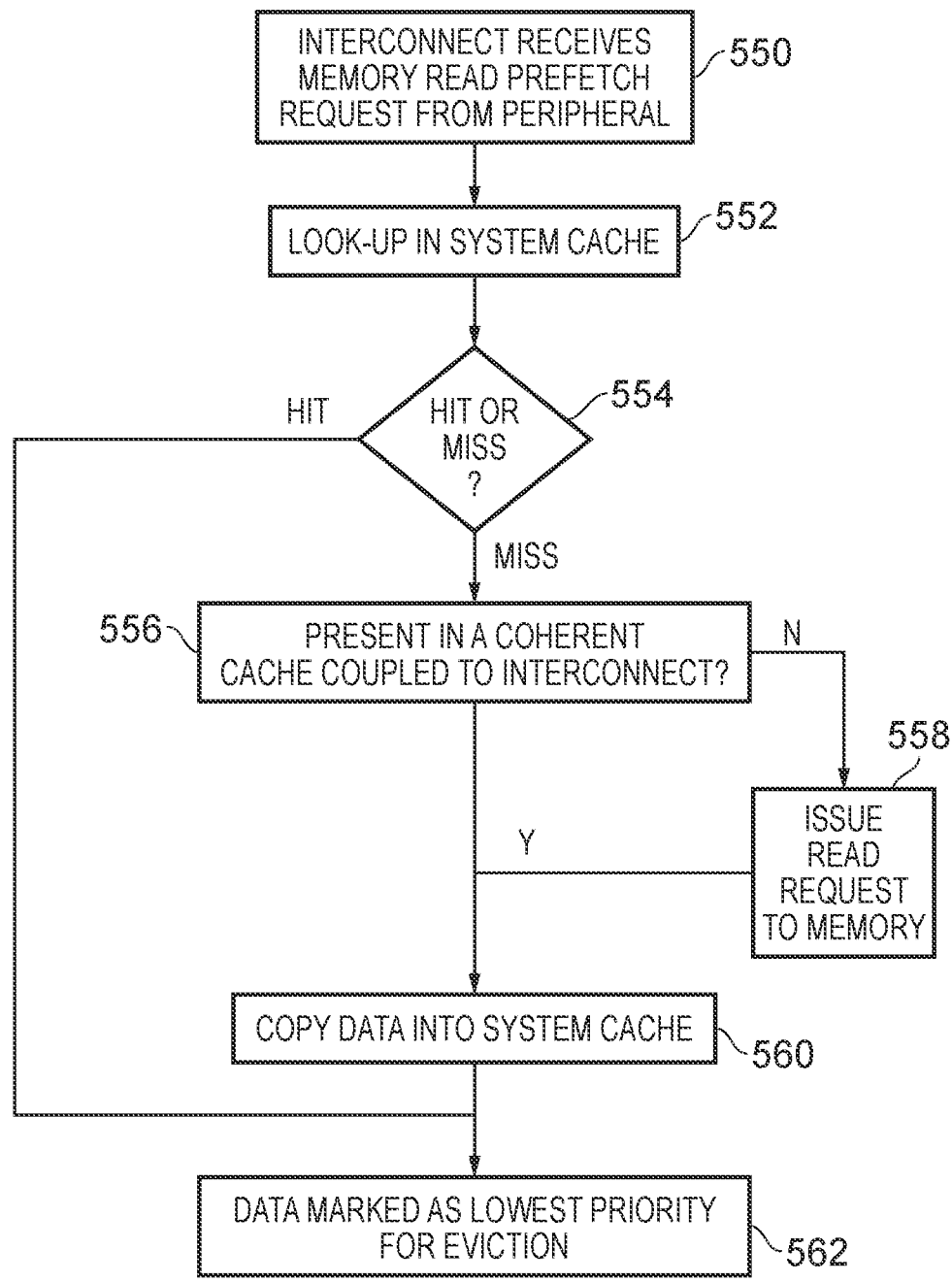
FIG. 9 is a flow diagram illustrating a sequence of steps which are taken by an interconnect in accordance with the method of some examples.

FIG. 9 is a flow diagram illustrating a sequence of steps which are taken by an interconnect in accordance with the method of some examples. At step 550 the interconnect receives a memory read prefetch request from a peripheral component. The target of the memory read prefetch request is looked up in the interconnect's system cache at step 552. At step 552 it is determined whether this results in a cache hit or a cache miss. In response to a cache hit the flow proceeds directly to step 562 where the data is marked as lowest priority for eviction. Otherwise in response to a cache miss it is determined at step 556 whether the data is present in a further coherent cache coupled to the interconnect. If it is not, then a read request is issued to the memory system to retrieve the required data cache line at step 558. By either route the data is caused to be copied into the system cache at step 560. Finally, at step 562 the data is marked as lowest priority for eviction.

Figure 10:
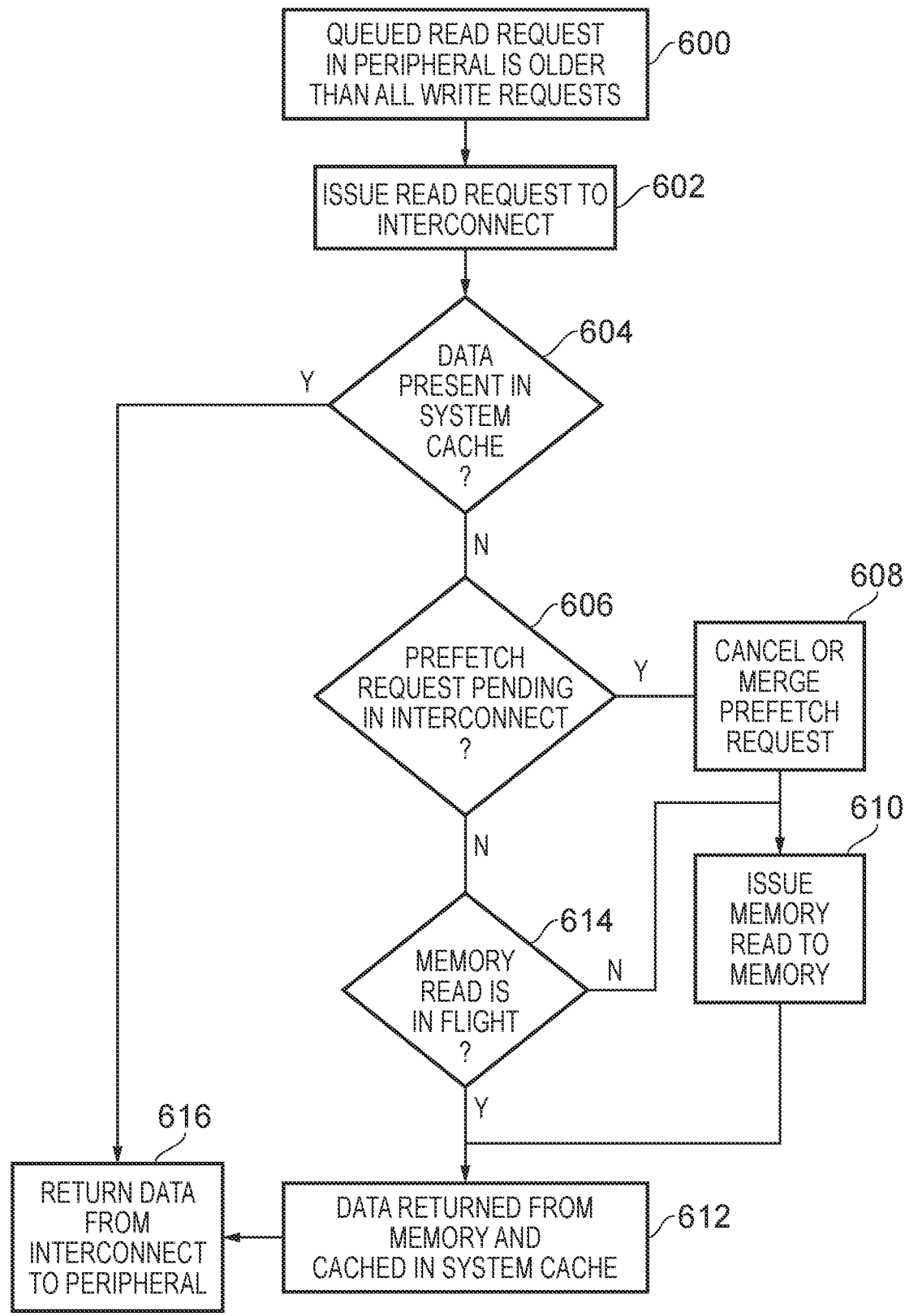
FIG. 10 is a flow diagram illustrating a sequence of steps which are taken in accordance with the method of some examples.

FIG. 10 is a flow diagram illustrating a sequence of steps which are taken in accordance with the method of some examples. At step 600 a queued memory read request reaches the front of the memory access request queue in the peripheral component and hence at step 602 the peripheral component issues the read request to the interconnect. It is then determined at step 604 if the required data is currently present in the system cache. If this is the case (in particular as may well be the case if the memory read prefetch request techniques described herein have preceded this point in time) then the flow proceeds to step 616 and the data is returned from the interconnect of the peripheral component. If however the data is not currently present in the system cache then at step 606 it is determined whether a corresponding memory read prefetch request is currently pending in the interconnect. When this is true then the flow proceeds via step 608 where either the memory read prefetch request is cancelled, or the memory read request is merged with memory read prefetch request. Subsequently at step 610 a memory read request is issued to the memory. Once the data has been returned from the memory and cached in the system cache, at step 612 the flow proceeds to step 616 where the data is returned from the interconnect to the peripheral component. Returning to a consideration of step 606 when there is not a corresponding prefetch request pending in the interconnect, it is then determined at step 614 if a corresponding memory read is currently in flight (i.e. a corresponding memory read prefetch request is still in flight). When this is the case then no further action is required and once the data returns from the memory and is cached in the system cache at step 612 it can be returned from the interconnect to the peripheral component of step 616. If however there is determined not to be a corresponding memory read request currently in flight at step 614 then the flow proceeds to step 610 for a memory read request to be issued.

The present techniques may also be embodiment in the following configurations set out as numbered clauses:

Clause 1. A data processing system comprising: an interconnect comprising a system cache;
a peripheral component coupled to the interconnect; and
a memory coupled to the interconnect,
wherein the peripheral component comprises a request ordering queue configured to queue received memory access requests in a receipt order, and wherein the peripheral component is configured to issue the memory access requests to the interconnect in the receipt order,
wherein the peripheral component is configured to delay issuance of a memory read request of the memory access requests to the interconnect until a completion response for all memory write requests ahead of the memory read request in the memory access requests has been received from the interconnect,
wherein the peripheral component is responsive to receipt of a memory read request to issue a memory read prefetch request comprising a physical address to the interconnect,
and the interconnect is responsive to the memory read prefetch request to cause data associated with the physical address in the memory to be cached in the system cache.

Clause 2. The data processing system as defined in clause 1, further comprising a memory management unit,
wherein the memory read request received by the peripheral component specifies a virtual address and the peripheral component is responsive to receipt of the memory read request to issue a translation request comprising the virtual address to the memory management unit,
wherein the memory management unit is responsive to the translation request to return a translation of the virtual address into the physical address to the peripheral component,
and wherein the peripheral component is responsive to the translation to issue the memory read prefetch request to the interconnect.

Clause 3. The data processing system as defined in clause 1 or clause 2, further comprising at least one cache coupled to the interconnect, wherein the interconnect is configured to administer a cache coherency policy with respect to the at least one cache and the system cache, and wherein the interconnect is responsive to the memory read prefetch request, when the data associated with the physical address in the memory is currently validly cached in one of the at least one cache, to cause the data to be copied into the system cache.

Clause 4. The data processing system as defined in clause 3, wherein the interconnect is responsive to a memory read request targeting the physical address, when copying of the data currently validly cached in one of the at least one caches into the system cache is still in-flight, to cause the data associated with the physical address in the memory to be returned in response to the memory read request once the copying completes.

Clause 5. The data processing system as defined in any of clauses 1-5, wherein the interconnect is configured to perform a look-up in the system cache on the basis of the physical address,
and when a cache miss results from the look-up the interconnect is configured to issue a prefetch memory read request targeting the physical address in the memory.

Clause 6. The data processing system as defined in clause 5, wherein the interconnect is responsive to a memory read request targeting the physical address, when the prefetch memory read request targeting the physical address in the memory which it issued is still in-flight, to cause the data associated with the physical address in the memory to be returned in response to the memory read request once the prefetch memory read request completes.

Clause 7. The data processing system as defined in clause 5 or clause 6, wherein the interconnect is responsive to a memory read request targeting the physical address, when the prefetch memory read request targeting the physical address in the memory is still held in a queue for issuance, to cancel the prefetch memory read request and to issue the memory read request targeting the physical address.

Clause 8. The data processing system as defined in any of clauses 5-7, wherein the interconnect is responsive to a memory read request targeting the physical address, when the prefetch memory read request targeting the physical address in the memory is issued but not yet complete, not to issue the memory read request targeting the physical address, and to await the return of the data resulting from the prefetch memory read request.

Clause 9. The data processing system as defined in any of clauses 1-8, wherein the interconnect is configured to perform a look-up in the system cache on the basis of the physical address,
and when a cache hit results from the look-up the interconnect is configured to modify an eviction priority for the data associated with the physical address in the memory which is cached in the system cache.

Clause 10. The data processing system as defined in clause 9, wherein the interconnect is configured to minimise the eviction priority for the data associated with the physical address in the memory which is cached in the system cache.

Clause 11. The data processing system as defined in clause 9 or clause 10, wherein the interconnect is configured to store a do-not-evict-until-read marker in association with the data associated with the physical address in the memory which is cached in the system cache.

Clause 12. The data processing system as defined in any of clauses 1-11, wherein the interconnect is responsive to a memory read request targeting the physical address to cause the data associated with the physical address in the memory which is cached in the system cache to be returned.

Clause 13. The data processing system as defined in any of clauses 1-12, wherein the peripheral component coupled to the interconnect comprises an interface configured to operate in compliance with the Peripheral Component Interconnect Express (PCIe) standard.

Clause 14. A method of operating a data processing system comprising an interconnect coupled to a peripheral component and a memory, the interconnect comprising a system cache, the method comprising:
  queuing received memory access requests in a receipt order and issuing the memory access requests to the interconnect in the receipt order;
  delaying issuance of a memory read request of the memory access requests to the interconnect until a completion response for all memory write requests ahead of the memory read request in the memory access requests has been received from the interconnect;
  in response to receipt by the peripheral component of a memory read request, issuing a memory read prefetch request to the interconnect from the peripheral component; and
  in response to the memory read prefetch request, causing data associated with the physical address in the memory to be cached in the system cache.

Clause 15. A peripheral component for coupling to an interconnect comprising a system cache, wherein the peripheral component comprises:
  a request ordering queue configured to queue received memory access requests in a receipt order, and wherein the peripheral component is configured to issue the memory access requests to the interconnect in the receipt order,
  wherein the peripheral component is configured to delay issuance of a memory read request of the memory access requests to the interconnect until a completion response for all memory write requests ahead of the memory read request in the memory access requests has been received from the interconnect, and
  wherein the peripheral component is responsive to receipt of a memory read request to issue a memory read prefetch request comprising a physical address to the interconnect.

Clause 16. The peripheral component as defined in clause 15,
  wherein the memory read request received by the peripheral component specifies a virtual address and the peripheral component is responsive to receipt of the memory read request to issue a translation request comprising the virtual address to a memory management unit coupled to the interconnect,
  and wherein the peripheral component is responsive to a translation of the virtual address into the physical address returned from the memory management unit to issue the memory read prefetch request to the interconnect.

Clause 17. The peripheral component as defined in clause 16, wherein the peripheral component is configured additionally to require a number of memory access requests ahead of the memory read request in the request ordering queue to be less than a predetermined number to issue the translation request to the memory management unit.

Clause 18. The peripheral component as defined in any of clauses 15-17, wherein the peripheral component is configured additionally to require a minimum number of memory access requests to be ahead of the memory read request in the request ordering queue to issue the memory read prefetch request to the interconnect.

Clause 19. The data processing system as defined in any of clauses 15-18, wherein the peripheral component coupled to the interconnect comprises an interface configured to operate in compliance with the Peripheral Component Interconnect Express (PCIe) standard.

Clause 20. A method of operating a peripheral component coupled to an interconnect comprising a system cache, the method comprising:
  queuing received memory access requests in a receipt order and issuing the memory access requests to the interconnect in the receipt order;
  delaying issuance of a memory read request of the memory access requests to the interconnect until a completion response for all memory write requests ahead of the memory read request in the memory access requests has been received from the interconnect;
  in response to receipt by the peripheral component of a memory read request, issuing a memory read prefetch request to the interconnect from the peripheral component to cause the interconnect.

In brief overall summary, peripheral components, data processing systems and methods of operating such peripheral components and data processing systems are disclosed. The systems comprise an interconnect comprising a system cache, a peripheral component coupled to the interconnect, and a memory coupled to the interconnect. The peripheral component has a memory access request queue for queuing memory access requests in a receipt order. Memory access requests are issued to the interconnect in the receipt order. A memory read request is not issued to the interconnect until a completion response for all older memory write requests has been received from the interconnect. The peripheral component is responsive to receipt of a memory read request to issue a memory read prefetch request comprising a physical address to the interconnect and the interconnect is responsive to the memory read prefetch request to cause data associated with the physical address in the memory to be cached in the system cache.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:
1. A data processing system comprising:
  an interconnect comprising a system cache;
  a peripheral component coupled to the interconnect; and
  a memory coupled to the interconnect,
  wherein the peripheral component comprises a request ordering queue configured to queue received memory access requests in a receipt order, and wherein the peripheral component is configured to issue the memory access requests to the interconnect in the receipt order, wherein the peripheral component is configured to delay issuance of a memory read request of the memory access requests to the interconnect until a completion response for all memory write requests ahead of the memory read request in the memory access requests has been received from the interconnect, wherein the peripheral component is responsive to receipt of the memory read request to issue a memory read prefetch request comprising a physical address to the interconnect, and the interconnect is responsive to the memory read prefetch request to cause data associated with the physical address in the memory to be cached in the system cache.

2. The data processing system as claimed in claim 1, further comprising a memory management unit, wherein the memory read request received by the peripheral component specifies a virtual address and the peripheral component is responsive to receipt of the memory read request to issue a translation request comprising the virtual address to the memory management unit, wherein the memory management unit is responsive to the translation request to return a translation of the virtual address into the physical address to the peripheral component, and wherein the peripheral component is responsive to the translation to issue the memory read prefetch request to the interconnect.

3. The data processing system as claimed in claim 1, further comprising at least one cache coupled to the interconnect, wherein the interconnect is configured to administer a cache coherency policy with respect to the at least one cache and the system cache, and wherein the interconnect is responsive to the memory read prefetch request, when the data associated with the physical address in the memory is currently validly cached in one of the at least one cache, to cause the data to be copied into the system cache.

4. The data processing system as claimed in claim 3, wherein the interconnect is responsive to a memory read request targeting the physical address, when copying of the data currently validly cached in one of the at least one caches into the system cache is still in-flight, to cause the data associated with the physical address in the memory to be returned in response to the memory read request once the copying completes.

5. The data processing system as claimed in claim 1, wherein the interconnect is configured to perform a look-up in the system cache on the basis of the physical address, and when a cache miss results from the look-up the interconnect is configured to issue a memory read prefetch request targeting the physical address in the memory.

6. The data processing system as claimed in claim 5, wherein the interconnect is responsive to a memory read request targeting the physical address, when the memory read prefetch request targeting the physical address in the memory which it issued is still in-flight, to cause the data associated with the physical address in the memory to be returned in response to the memory read request once the memory read prefetch request completes.

7. The data processing system as claimed in claim 5, wherein the interconnect is responsive to a memory read request targeting the physical address, when the memory read prefetch request targeting the physical address in the memory is still held in the request ordering queue for issuance, to cancel the memory read prefetch request and to issue the memory read request targeting the physical address.

8. The data processing system as claimed in claim 5, wherein the interconnect is responsive to a memory read request targeting the physical address, when the memory read prefetch request targeting the physical address in the memory is issued but not yet complete, not to issue the memory read request targeting the physical address, and to await the return of the data resulting from the memory read prefetch request.

9. The data processing system as claimed in claim 1, wherein the interconnect is configured to perform a look-up in the system cache on the basis of the physical address, and when a cache hit results from the look-up the interconnect is configured to modify an eviction priority for the data associated with the physical address in the memory which is cached in the system cache.

10. The data processing system as claimed in claim 9, wherein the interconnect is configured to minimise the eviction priority for the data associated with the physical address in the memory which is cached in the system cache.

11. The data processing system as claimed in claim 9, wherein the interconnect is configured to store a do-not-evict-until-read marker in association with the data associated with the physical address in the memory which is cached in the system cache.

12. The data processing system as claimed in claim 1, wherein the interconnect is responsive to a memory read request targeting the physical address to cause the data associated with the physical address in the memory which is cached in the system cache to be returned.

13. The data processing system as claimed in claim 1, wherein the peripheral component coupled to the interconnect comprises an interface configured to operate in compliance with the Peripheral Component Interconnect Express (PCIe) standard.

14. A method of operating a data processing system comprising an interconnect coupled to a peripheral component and a memory, the interconnect comprising a system cache, the method comprising:

queuing received memory access requests in a receipt order and issuing the memory access requests to the interconnect in the receipt order;

delaying issuance of a memory read request of the memory access requests to the interconnect until a completion response for all memory write requests ahead of the memory read request in the memory access requests has been received from the interconnect;

in response to receipt by the peripheral component of a memory read request, issuing a memory read prefetch request comprising a physical address to the interconnect from the peripheral component; and in response to the memory read prefetch request, causing data associated with the physical address in the memory to be cached in the system cache.

15. A peripheral component for coupling to an interconnect, the interconnect comprising a system cache, wherein the peripheral component comprises:

a request ordering queue configured to queue received memory access requests in a receipt order, and wherein the peripheral component is configured to issue the memory access requests to the interconnect in the receipt order, wherein the peripheral component is configured to delay issuance of a memory read request of the memory access requests to the interconnect until a completion response for all memory write requests ahead of the memory read request in the memory access requests has been received from the interconnect, and wherein the peripheral component is responsive to receipt of the memory read request to issue a memory read prefetch request comprising a physical address to the interconnect.

16. The peripheral component as claimed in claim 15, wherein the memory read request received by the peripheral component specifies a virtual address and the peripheral component is responsive to receipt of the memory read request to issue a translation request comprising the virtual address to a memory management unit coupled to the interconnect, and wherein the peripheral component is responsive to a translation of the virtual address into the physical address returned from the memory management unit to issue the memory read prefetch request to the interconnect.

17. The peripheral component as claimed in claim 16, wherein the peripheral component is configured additionally to require a number of memory access requests ahead of the memory read request in the request ordering queue to be less than a predetermined number to issue the translation request to the memory management unit.

18. The peripheral component as claimed in claim 15, wherein the peripheral component is configured additionally to require a minimum number of memory access requests to be ahead of the memory read request in the request ordering queue to issue the memory read prefetch request to the interconnect.

19. The data processing system as claimed in claim 15, wherein the peripheral component coupled to the interconnect comprises an interface configured to operate in compliance with the Peripheral Component Interconnect Express (PCIe) standard.

20. A method of operating a peripheral component coupled to an interconnect, the interconnect comprising a system cache, the method comprising:

queuing received memory access requests in a receipt order and issuing the memory access requests to the interconnect in the receipt order;

delaying issuance of a memory read request of the memory access requests to the interconnect until a completion response for all memory write requests ahead of the memory read request in the memory access requests has been received from the interconnect;

in response to receipt by the peripheral component of a memory read request, issuing a memory read prefetch request to the interconnect from the peripheral component.

\* \* \* \* \*